(12) United States Patent
Shang et al.

(10) Patent No.: US 11,556,255 B2
(45) Date of Patent: Jan. 17, 2023

(54) METHOD, DEVICE AND COMPUTER PROGRAM PRODUCT FOR STORAGE

(71) Applicant: EMC IP Holding Company LLC, Hopkinton, MA (US)

(72) Inventors: Rongrong Shang, Beijing (CN); Xiaobo Zhang, Beijing (CN); Haiying Tang, Beijing (CN); Changyu Feng, Beijing (CN); Jian Gao, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 232 days.

(21) Appl. No.: 16/934,450

(22) Filed: Jul. 21, 2020

(65) Prior Publication Data

US 2021/0216225 A1 Jul. 15, 2021

(30) Foreign Application Priority Data

Jan. 15, 2020 (CN) .......................... 202010043381.7

(51) Int. Cl.
*G06F 3/00* (2006.01)
*G06F 3/06* (2006.01)

(52) U.S. Cl.
CPC .......... *G06F 3/0631* (2013.01); *G06F 3/0604* (2013.01); *G06F 3/0689* (2013.01)

(58) Field of Classification Search
CPC ..... G06F 3/0631; G06F 3/0604; G06F 3/0689
See application file for complete search history.

(56) References Cited

U.S. PATENT DOCUMENTS

| 8,566,673 | B2 | 10/2013 | Kidney et al. |
| 10,146,447 | B1 * | 12/2018 | Dong ................. G06F 11/1076 |
| 10,705,907 | B1 | 7/2020 | Ben-Moshe et al. |
| 10,852,966 | B1 | 12/2020 | Liu et al. |
| 11,068,389 | B2 | 7/2021 | Gao et al. |
| 2008/0114931 | A1 * | 5/2008 | Aoki .................. G06F 11/3447 |
| | | | 711/E12.002 |
| 2018/0285198 | A1 * | 10/2018 | Dantkale ............. G06F 12/0868 |

* cited by examiner

*Primary Examiner* — Craig S Goldschmidt
(74) *Attorney, Agent, or Firm* — BainwoodHuang

(57) ABSTRACT

Techniques involve determining the number of disks in a Redundant Array of Independent Disks (RAID) storage system, and the storage system comprises multiple types of mixed disks. The techniques further involve determining a target number of RAID sets to be allocated in the storage system according to the number of disks and a predetermined threshold, and then allocating the multiple types of disks to the RAID sets according to the target number and types of disks. Such techniques propose a way to allocate mixed disks to the corresponding RAID sets. When the RAID set grouping is performed to mixed disks of the storage system, the same type of disks are allocated in the same RAID set as much as possible, thereby improving the performance of the storage system.

20 Claims, 6 Drawing Sheets

METHOD, DEVICE AND COMPUTER PROGRAM PRODUCT FOR STORAGE

CROSS-REFERENCE TO RELATED APPLICATION

This application claims priority to Chinese Patent Application No. CN202010043381.7, on file at the China National Intellectual Property Administration (CNIPA), having a filing date of Jan. 15, 2020, and having "METHOD, DEVICE AND COMPUTER PROGRAM PRODUCT FOR STORAGE" as a title, the contents and teachings of which are herein incorporated by reference in their entirety.

FIELD

Embodiments of the present disclosure generally relate to the field of data storage, and more specifically, to a method, device and computer program product for storage.

BACKGROUND

Redundant Array of Independent Disks (RAID) is a data backup technology, and it combines a plurality of independent physical disks to form an array of disks in a different way (i.e., logical disks), thereby providing better storage performance and higher reliability than a single disk. To recover data in case of a disk failure in RAID, one parity information block (such as RAID 1, RAID 3, or RAID 5) or multiple parity information blocks (such as RAID 6) are provided in RAID. Take RAID 5 as an example, if a disk in RAID fails, a new disk may be added to the RAID. Then, RAID can calculate the data in the failed disk through the distributed parity information, and reconstruct the data in the new disk to recover the data.

Generally, in one RAID, there may be multiple disks, and the number of disks is equal to or larger than the RAID width. Each disk is split into multiple disk slices, and each slice may have a fixed size (such as 4 GB, etc.). RAID usually stores data by use of strips. For example, for RAID 5, 5 disk slices on 5 disks may be combined to form a RAID stripe set. The stripe set is also referred to as "Uber", which includes multiple stripes. That is, 4 data blocks and 1 parity information block (that is, "4D+1P") combine a stripe set. When a disk in the RAID fails, the failed disk can be reconstructed by use of distributed parity information so that data can be recovered and will not be lost.

SUMMARY

Embodiments of the present disclosure provide a method, device and computer program product for storage.

In an aspect of the present disclosure, there is provided a method for storage. The method includes determining the number of disks in a storage system that is based on RAID and includes multiple types of disks. The method further includes determining a target number of RAID sets to be allocated in the storage system according to the number of disks and a predetermined threshold, and allocating multiple types of disks to the RAID sets according to the target number and types of disks.

In another aspect of the present disclosure, there is provided an electronic device. The device includes a processing unit and a memory coupled to the processing unit and storing instructions. The instructions, when executed by the processing unit, perform acts of: determining the number of disks in a storage system that is based on RAID and includes multiple types of disks; determining a target number of RAID sets to be allocated in the storage system according to the number of disks and a predetermined threshold; and allocating multiple types of disks to the RAID sets according to the target number and types of disks.

In a further aspect of the present disclosure, there is provided a computer program product tangibly stored on a non-transitory computer-readable medium and including machine executable instructions. The instructions, when executed by a device, cause the device to perform the method or process according to embodiments of the present disclosure.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the following detailed description with reference to the accompanying drawings, the above and other objectives, features, and advantages of example embodiments of the present disclosure will become more apparent. In example embodiments of the present disclosure, the same reference numbers generally refer to the same components.

DETAILED DESCRIPTION OF EMBODIMENTS

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred embodiments of the present disclosure will be described in more detail below with reference to the drawings. Although the drawings illustrate specific embodiments of the present disclosure, it should be appreciated that the present disclosure may be implemented in various manners and should not be limited to the embodiments explained herein. On the contrary, these embodiments are provided to make the present disclosure more thorough and complete and to fully convey the scope of the present disclosure to those skilled in the art.

As used herein, the term "comprise" and its variants are to be read as open-ended terms that mean "comprise, but not limited to." The term "or" is to be read as "and/or" unless the context clearly indicates otherwise. The term "based on" is to be read as "based at least partly on." The terms "one example embodiment" and "one embodiment" are to be read as "at least one example embodiment." The term "a further embodiment" is to be read as "at least a further embodiment." The terms "first", "second" and so on may refer to same or different objects unless explicitly indicated to be different.

Traditionally, the number of disks in one RAID set may be larger than the RAID width. For example, one RAID 5 set may include more than 5 disks, and the RAID set may be, for example, a RAID resilience set (RRS). In general, an RSS has an upper limit on the number of disks. For example, an upper limit number of disks in the RAID 5 RSS may be 25. If there is more than the upper limit number of disks (such as 25), the disks need to be divided into multiple RSSs.

Figure 1:
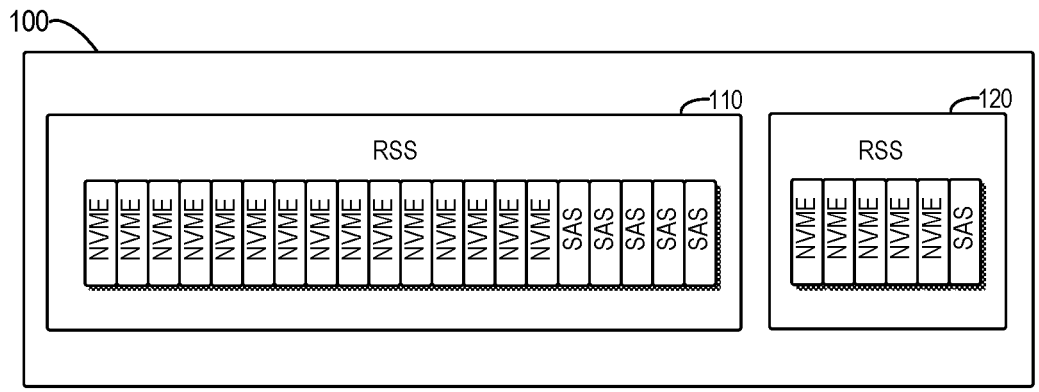
FIG. 1 illustrates a schematic diagram of an example environment of the traditional RAID set grouping.

The disks in a storage system may have multiple types of disks (such as Solid State disk, SSD) at the same time because of different purchase batches and times. The traditional methods do not distinguish or pay attention to the types of the disks when performing RSS grouping to the disks. By contrast, the traditional methods treat all disks as the same type and perform a random allocation. For example, FIG. 1 illustrates a schematic diagram of an example environment of a traditional RAID set grouping. As shown in FIG. 1, the storage system 100 includes 20 Non-volatile Memory Fast (NVME) Solid State Disks (SSDs) and 6. Serial-Attached SCSI (SAS) SSDs. Since the total number of disks exceeds the upper limit of the number of RSS disks (such as 25), it needs to be divided into 2 RSSs. The traditional methods do not distinguish different types of disks and treat all SSDs as the same type. Therefore, these disks are randomly organized into RSS 110 and RSS 120. RSS 110 and RSS 120 include two types of disks (NVME SSDs and SAS SSDs) respectively, and the performance of NVME SSD is better than that of SAS SSD. Therefore, it is necessary to allocate strip sets across different types of disks. It can be seen that the traditional methods cannot give full play to the high performance of NVME SSDs, which affects the performance of the entire storage system.

To this end, embodiments of the present disclosure propose a new scheme of allocating mixed disks to a RAID set. The inventors of the present application found that, because the relationships between different types of disks in a storage system are both independent and related, they can neither simply be divided into different RAID devices, nor completely regarded as the same type of disks (due to different performances), so the embodiments of the present disclosure propose a new method of generating a preferred RSS group. According to embodiments of the present disclosure, when the RAID set grouping is performed in a storage system, different types of disks are distinguished so that the same type of disks are allocated in the same RAID set as much as possible, thereby improving the performance of the storage system. Therefore, embodiments of the present disclosure can realize a larger available capacity and better IO performance of the entire RAID sets by properly organizing mixed disks when performing the RSS grouping.

For example, in some embodiments, in mixed SSDs including NVME SSDs and SAS SSDs, since the performance of the NVME SSD is better than that of the SAS SSD, the NVME SSD and the SAS SSD are differentiated in different RSSs so that the storage tier of the NVME SSDs can provide better storage services. In other words, if NVME SSDs and SAS SSDs are set separately in different RSSs without mixing NVME SSDs and SAS SSDs, different types of SSDs in the same RSS would be avoided so as to obtain better storage performance. In addition, if there is no guarantee that there is only one type of disk in one RSS, then the same type of disks may be included as much as possible.

The basic principle and several example implementations of the present disclosure are described with reference to FIGS. 2 to 9. It should be understood that these example embodiments are given only to enable those skilled in the art to better understand the embodiments of the present disclosure and not to limit the scope of the present disclosure in any way.

Figure 2:
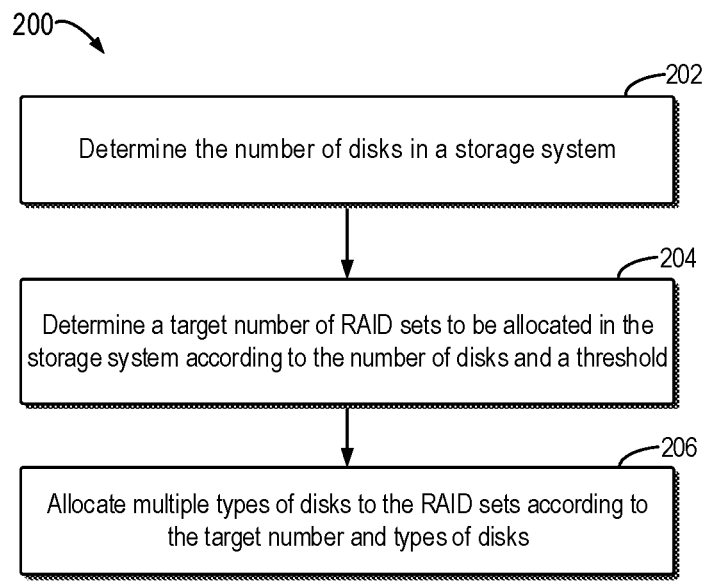
FIG. 2 illustrates a flowchart of a method for allocating mixed disks to RAID sets according to embodiments of the present disclosure.

FIG. 2 illustrates a flowchart of a method 200 for allocating mixed disks to a RAID set according to an embodiment of the present disclosure.

At 202, the number of disks in the storage system is determined, where the storage system is implemented through RAID and includes multiple types of disks. In some embodiments, the storage system includes both NVME SSDs and SAS SSDs. Although NVME SSD disk and SAS SSD disk are taken as examples of the two types of disks in some embodiments of the present disclosure, other types of disks or solid state disks currently known or developed in the future also may be used in conjunction with embodiments of the present disclosure. For example, the storage system 100 includes 20 NVME SSDs and 6 SAS SSDs, and the total number of disks is 26.

At 204, a target number of the RAID sets to be allocated in the storage system is determined according to the number of disks and a predetermined threshold. For example, the predetermined threshold may be an upper limit number of disks in each RSS (such as 25), and then the RSSs that need to be split may be determined by comparing the number of disks and the predetermined threshold. For example, in the storage system 100, it is determined that 26 disks need to be allocated into 2 RSSs.

At 206, multiple types of disks are allocated to the RAID sets based on the target number and types of disks. In some embodiments, when the target number of RSSs is 1, it may be further determined whether to move the NVME SSD(s) to the SAS SSD allocation environment or move the SAS SSD(s) to the NVME SSD allocation environment. In some embodiments, when the target number of RSSs is greater than 1, it may be further determined how to arrange the RSS sets. An example implementation of the allocation of multiple RSSs is shown below with reference to FIG. 5.

Figure 3:
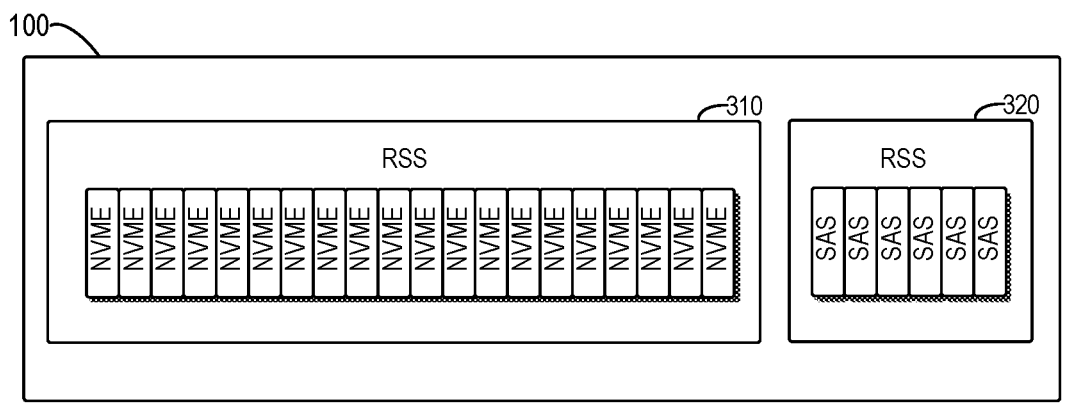
FIG. 3 illustrates a schematic diagram of an example environment of RAID set grouping according to an embodiment of the present disclosure.

For example, FIG. 3 illustrates a schematic diagram of an example environment of RAID set grouping according to an embodiment of the present disclosure. With the method 200, the mixed disks in the storage system 100 can be divided into RSS 310 (which is completely composed of NVME SSDs) and RSS 320 (which is completely composed of SAS SSDs). Therefore, RSS 310 can provide optimal storage service and RSS 320 can provide sub-optimal storage service. Since the performance of NVME SSD is better than that of SAS SSD, the storage service provided by RSS 310 is better as compared with RSS 320.

As shown in FIG. 3, each RSS constitutes a fault domain, which means that if one disk drive in a certain RSS fails, it will not affect the reliability of other RSSs. For example, a reliability model can be used to evaluate reliability of RAID. In order to obtain high reliability of RAID, the number of disks involved in the reconstruction needs to be limited. Therefore, the disk in each RRS has a maximum upper limit of 25. When this upper limit is exceeded, the performance of RSS will be reduced. If the number of disks is greater than 25, it is necessary to create another RRS to divide the disks into multiple RSSs. In an embodiment of the present disclosure, each RSS may include multiple disks, for example, between 6 and 25.

Therefore, in embodiments of the present disclosure, when the RAID set grouping is performed on a storage system, the same type of disks are allocated in the same RAID set as much as possible, thereby improving the performance of the storage system.

To divide disks in the storage system into one or more RSSs, two stages are usually required. In the first stage, the type and number of disks to be allocated in each RSS are determined. In the second stage, each disk is mapped to the corresponding RSS. For example, the old disks in the old RSS may be mapped first, and then the new disk(s) is mapped. The mapping result may include the ID of each disk.

In the first stage, each RSS type allocation environment is initialized first, and all disks of the same type are grouped in descending order by their capacity, no matter whether it is a new disk or old disk. At this stage, NVME SSDs and SAS SSDs are grouped separately. Then, an RSS allocation algorithm according to embodiments of the present disclosure may be executed.

Figure 4A:
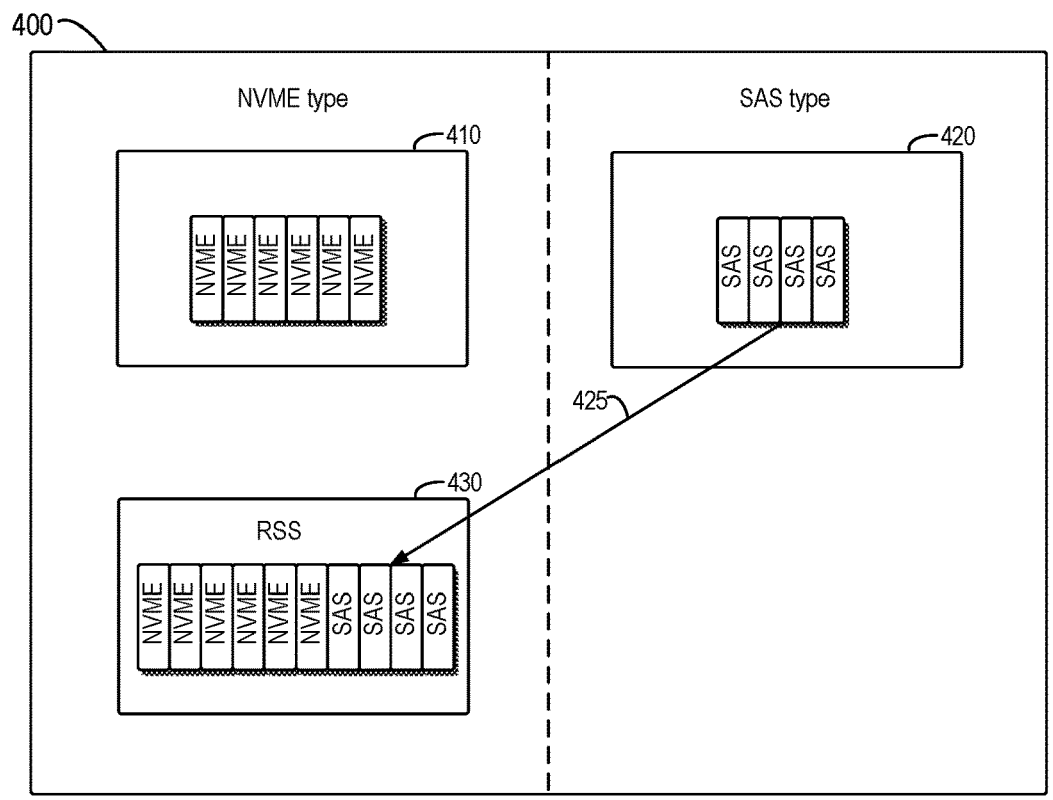
FIGS. 4A and 4B illustrate schematic diagrams of the allocation of a single RAID resilience set (RRS) according to an embodiment of the present disclosure.
Figure 4B:
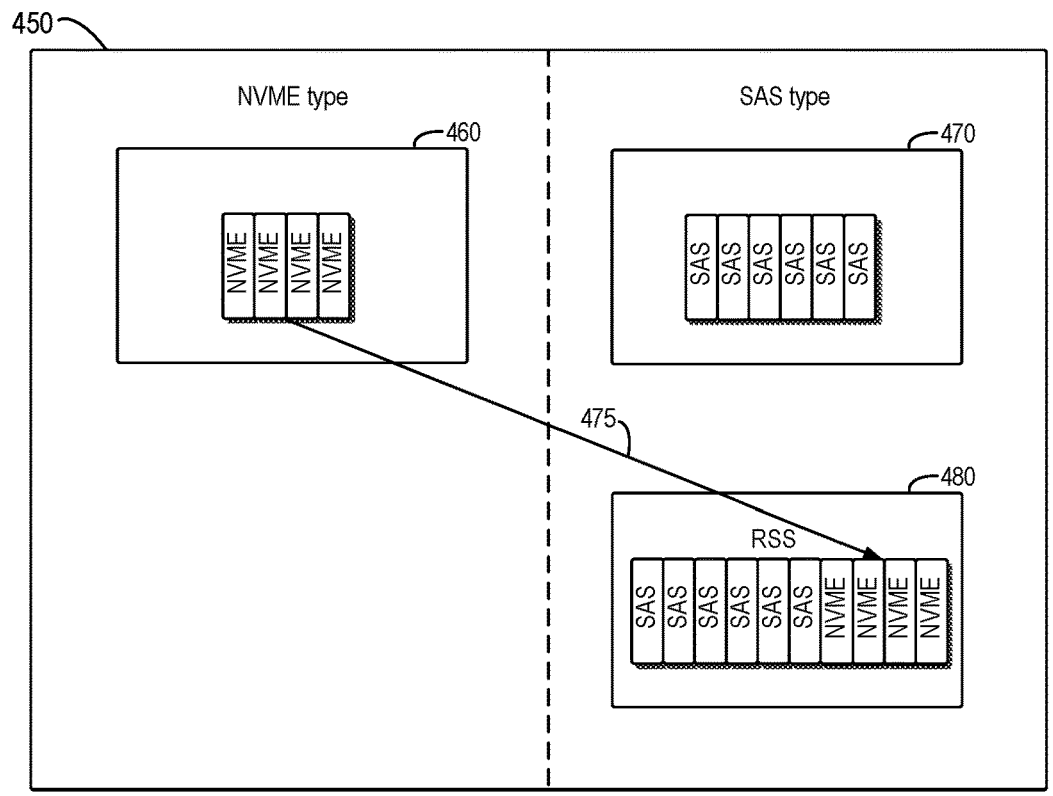
Figure 5:
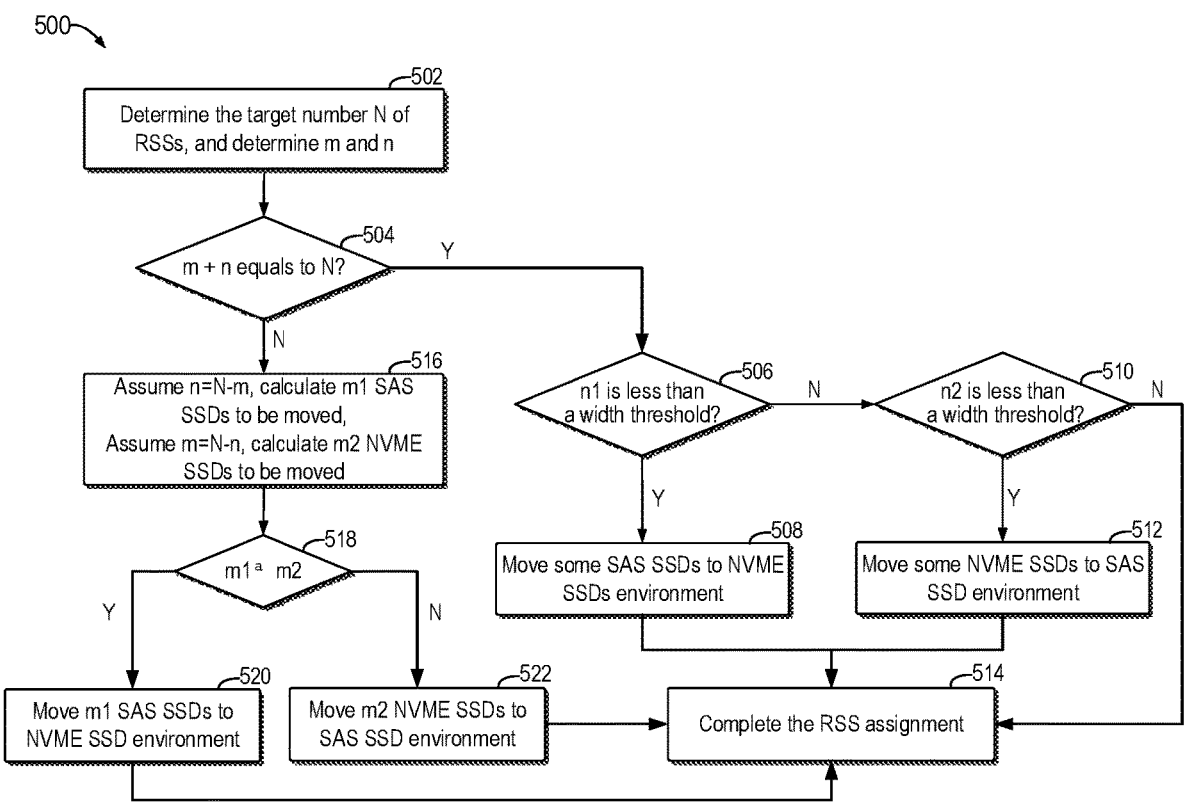
FIG. 5 illustrates a flowchart of a method for the allocation of a plurality of RSSs according to an embodiment of the present disclosure.
Figure 6:
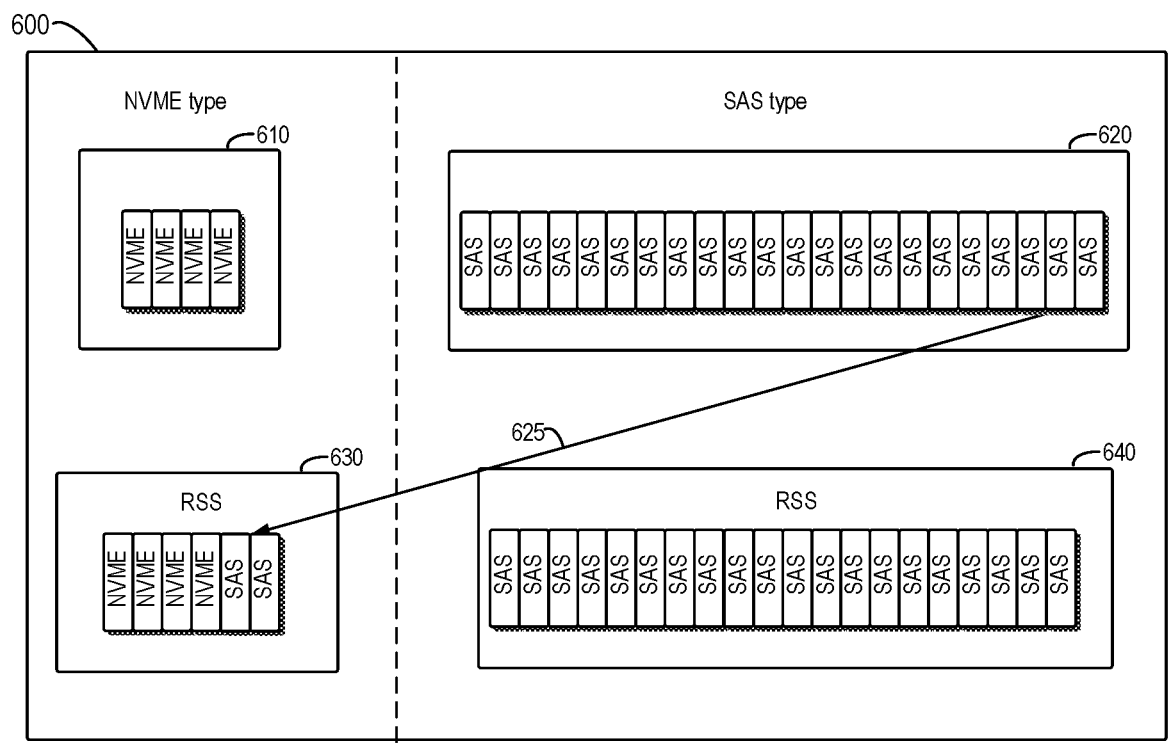
FIG. 6 illustrates a schematic diagram of the allocation of a plurality of RSSs according to an embodiment of the present disclosure.
Figure 7:
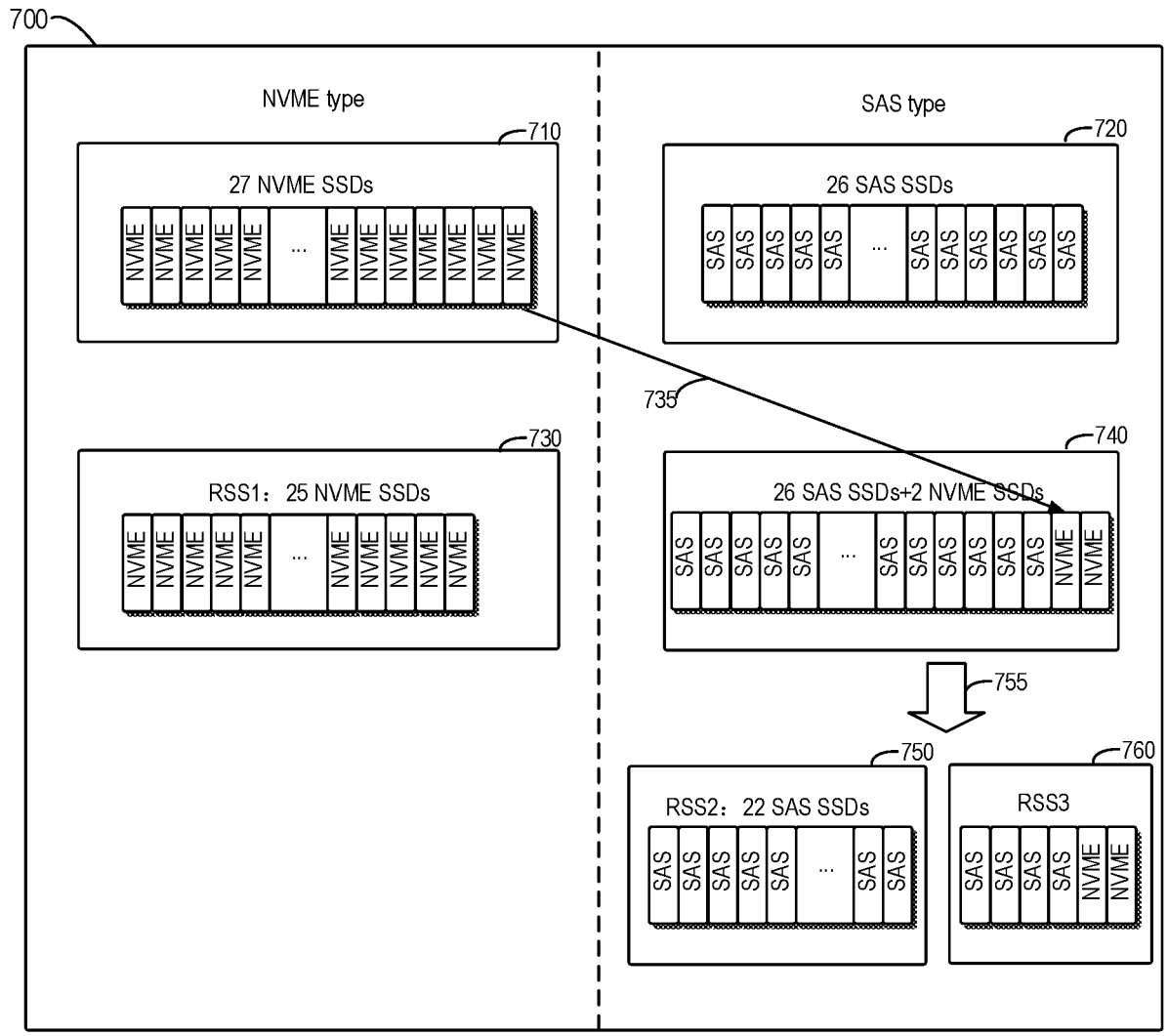
FIG. 7 illustrates another schematic diagram of the allocation of a plurality of RSSs according to an embodiment of the present disclosure.

Generally, for an RSS with an upper limit number of the disks of a predetermined threshold (such as 25), if the total number of disks in the storage system is less than or equal to the predetermined threshold, there is only one RSS, and all NVME SSD(s) will be moved to the SAS SSD allocation environment, or all SAS SSD(s) will be moved to the NVME SSD allocation environment. If the total number of disks is greater than the predetermined threshold, there are two or more RSSs, and the number m of RSSs of the entire NVME SSDs and the number n of RSSs of the entire SAS SSDs need to be determined respectively. FIGS. 4A and 4B show example implementations of the allocation of one RSS, and FIGS. 5-7 show example implementation of the allocation of multiple RSSs. In some embodiments, when some disks are moved, it may be preferred to select a disk with a smaller capacity in the corresponding allocation environment.

FIGS. 4A and 4B illustrate schematic diagrams of an allocation of a single RRS according to an embodiment of the present disclosure. In the embodiment of the present disclosure, a RAID device type of RSS may be set, such as an NVME type and an SAS type. However, this is only a flag of an attribute of the RSS, the NVME type RSS may also include SAS SSD(s), while SAS type RSS may also include NVME SSD(s). When there is only one RSS, the RSS type can be set to the NVME type or the SAS type depending on the number of NVME SSDs and the number of SAS SSDs.

If the number of NVME SSDs is greater than or equal to the width threshold, the RSS type is set as the NVME type, where the width threshold is equal to the RAID width plus 1, for example, in RAID 5, the width threshold is 6. As shown in FIG. 4A, in the storage system 400, there are 6 NVME SSDs 410 and 4 SAS SSDs 420, and all SAS SSDs will be moved to the NVME SSD allocation environment so as to form an RSS 430, as shown in 425.

If the number of NVME SSDs is less than the width threshold, the RSS type is set as SAS type regardless of the number of SAS SSDs. As shown in FIG. 4B, in the storage system 450, there are 4 NVME SSDs 460 and 6 SAS SSDs 470, and all NVME SSDs will be moved to the SAS SSD allocation environment to form RSS 480, as shown in 475.

FIG. 5 illustrates a flowchart of a method for the allocation of multiple RSSs according to an embodiment of the present disclosure. It shows the number of NVME SSDs to be moved to the SAS SSD allocation environment or the number of SAS SSDs to be moved to the NVME SSD allocation environment.

At 502, the target number N of the RSSs is determined, where N=round up ((number n1 of NVME SSDs and number n2 of SAS SSDs)/upper limit number of disks in each RSS). Then, the first number m for NVME SSDs is determined, which is equal to rounding up (n1/25), and the second number n for SAS SSDs is determined, which is equal to rounding up (n2/25).

At 504, it is determined whether the sum of m and n is equal to N. If yes, it is further determined at 506 whether n1 is less than the width threshold (i.e., RAID width+1, for example, 6). If YES is determined at 506, then (width threshold-n1) SAS SSDs are moved to the NVME SSD allocation environment at 508. If NO is determined at 506, then it is further determined whether n2 is less than the width threshold at 510. If YES is determined at 510, then (width threshold-n2) NVME SSDs are moved to SAS SSD allocation environment at 512. If NO is determined at 510, that is, in most other cases, the disk movement and adjustment are not required, and the allocation of the RSSs is completed at 514.

For example, FIG. 6 shows an example scenario wherein YES is determined at 504. As shown in FIG. 6, the storage system 600 includes 4 NVME SSDs 610 and 22 SAS SSDs 620. Since the sum of m (such as 1) and n (such as 1) is equal to N (such as 2), and n1 (such as 4) is smaller than the width threshold (such as 6), so (6-4) SAS SSDs need to be moved to the NVME SSD allocation environment, as shown in 625, thereby forming an NVME type RSS 630 and an SAS type RSS 640.

Referring back to FIG. 5, at 516, assuming n=N−m, the number of SAS SSDs to be moved to the NVME SSD allocation environment is calculated, that is, m1=n2−25× (N−m). Meanwhile, assuming m=N−n, the number of NVME SSDs to be moved to the SAS SSD allocation environment is calculated, that is, m2=n1−25×(N−n). In other words, the number of disks moved from NVME type RSSs to the SAS type RSSs is calculated, the number of disks moved from the SAS type RSSs to the NVME type RSSs is calculated, and a scheme with fewer disks to be moved will be selected.

Next, at 518, it is determined whether m1 is less than or equal to m2. If YES is determined at 518, then at 520, it is determined that the number of NVME type RSS(s) is m and the number of SAS type RSS(s) is N−m, and then m1 SAS SSDs are moved to the NVME SSD allocation environment.

If NO is determined at 518, then at 522, it is determined that the number of NVME type RSS(s) is N−n and the number of SAS type RSS(s) is n, and then m2 NVME SSDs are moved to the SAS SSD allocation environment. The allocation of RSS is then completed at 514.

For example, FIG. 7 illustrates an example scenario where NO is determined at 504. As shown in FIG. 7, the storage system 700 includes 27 NVME SSDs 710 and 26 SAS SSDs 720. Since the sum of m (i.e., 2) and n (i.e., 2) is not equal to N (i.e., 3), two NVME SSDs are moved to the SAS SSD allocation environment, as shown in 725, thereby forming a NVME type RSS 730 and a disk set 740. The disk set 740 is further divided into an RSS 750 and an RSS 760, as shown at 755. After successful movement and adjustment, the RSS algorithm may be executed for each RSS type. The NVME SSD allocation environment and the SAS SSD allocation environment can call the RSS algorithm separately.

Figure 8:
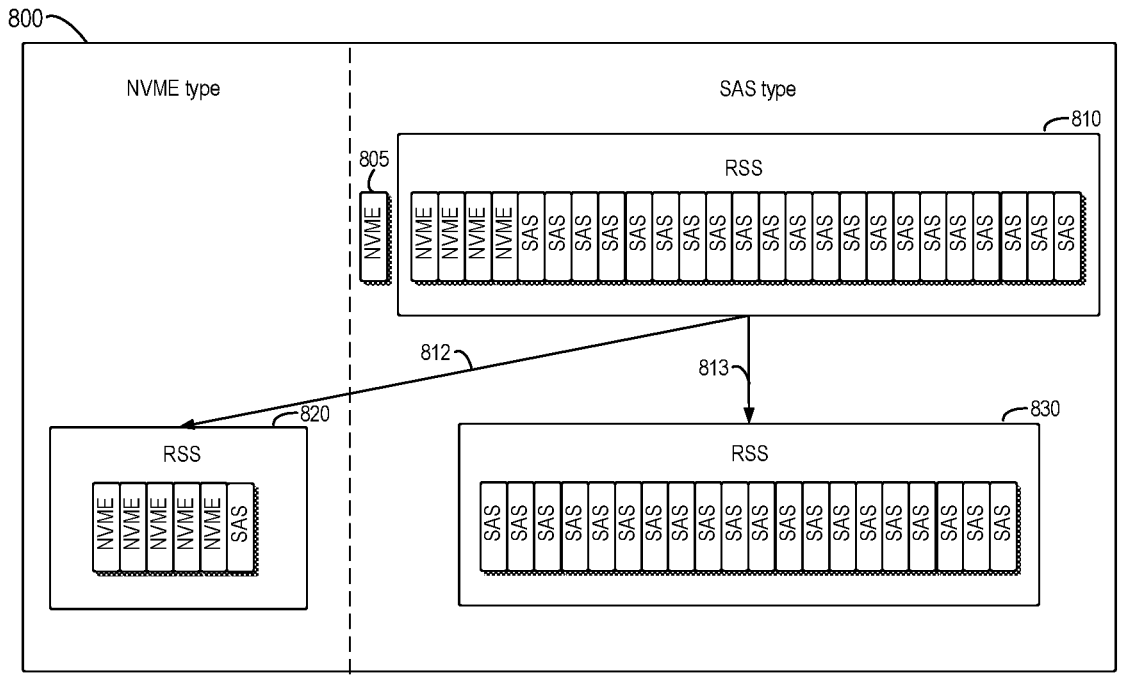
FIG. 8 illustrates a schematic diagram of the allocation of RSS when a new disk is added according to an embodiment of the present disclosure.

Next, in the second stage, each disk is mapped to the corresponding RSS. FIG. 8 illustrates a schematic diagram of the allocation of an RSS when a new disk is added according to an embodiment of the present disclosure. FIG. 8 shows a process of combining the old disks in the old RSS and the new disk into new RSS sets.

As shown in FIG. 8, the old RSS 810 includes 4 NVME SSDs and 21 SAS SSDs. After adding a new NVME SSD disk 805, since there are 26 disks in total, the disks need to be divided into 2 RSSs. 5 NVME SSDs and 1 SAS SSD disk are combined into an NVME type RSS 820, and 20 SAS SSDs are combined into an SAS type RSS 830, as shown in 812 and 813.

The mapping steps in FIG. 8 may be as below. First, 4 old NVME SSDs are mapped to the new NVME type RSS 820, and 20 SAS SSDs are mapped to the SAS type RSS 830. Second, 1 new NVME SSD disk 805 is mapped to the new NVME type RSS 820, and finally 1 old SAS SSD disk is mapped to the new NVME type RSS 820. Generally, when mapping old disks in an old RSS, the old disks are preferentially mapped to the same type of RSS as they are.

Therefore, embodiments of the present disclosure propose a method for organizing mixed disks into RSS groups, which can reduce disk mixing in the same RSS while supporting disk mixing in one RSS. According to embodiments of the present disclosure, it is possible to provide higher available capacity and better IO performance for mixed disks in the storage system as compared with traditional methods.

In addition, the following Table 1 below shows some examples of different RSS groups generated for different disk configurations.

TABLE 1

RSS groups for different scenarios

| Original Disk configuration | RRS grouping result | Add new disks | New RRS grouping result |
|---|---|---|---|
| 11 NVME SSDs and 3 SAS SSDs | RRS 1:<br>Type: NVME<br>Disks: 11 NVME SSDs and 3 SAS SSDs | Add 12 SAS SSDs | RRS 1:<br>Type: NVME<br>Disks: 11 NVME SSDs<br>RRS 2:<br>Type: SAS<br>Disks: 15 SAS SSDs |
| 4 NVME SSDs and 23 SAS SSDs | RRS 1:<br>Type: NVME<br>Disks: 4 NVME SSDs and 2 SAS SSDs<br>RRS 2:<br>Type: SAS<br>Disks: 21 SAS SSDs | Add 2 NVME SSDs | RRS 1:<br>Type: NVME<br>Disks: 6 NVME SSDs<br>RRS 2:<br>Type: SAS<br>Disks: 23 SAS SSDs |
| 6 NVME SSDs and 48 SAS SSDs | RRS 1:<br>Type: NVME<br>Disks: 6 NVME SSDs<br>RRS 2:<br>Type: SAS<br>Disks: 25 SAS SSDs<br>RRS 2:<br>Type: SAS<br>Disks: 23 SAS SSDs | Add 6 SAS SSDs | RRS 1:<br>Type: NVME<br>Disks: 6 NVME SSDs and 4 SAS SSDs<br>RRS 2:<br>Type: SAS<br>Disks: 25 SAS SSDs<br>RRS 2:<br>Type: SAS<br>Disks: 25 SAS SSDs |
| 25 NVME SSDs and 3 SAS SSDs | RRS 1:<br>Type: NVME<br>Disks: 22 NVME SSDs<br>RRS 2:<br>Type: SAS<br>Disks: 3 SAS SSDs and 3 NVME SSDs | Add 6 SAS SSDs and 5 NVME SSDs | RRS 1:<br>Type: NVME<br>Disks: 25 NVME SSDs<br>RRS 2:<br>Type: SAS<br>Disks: 5 NVME SSDs and 9 SAS SSDs |

Figure 9:
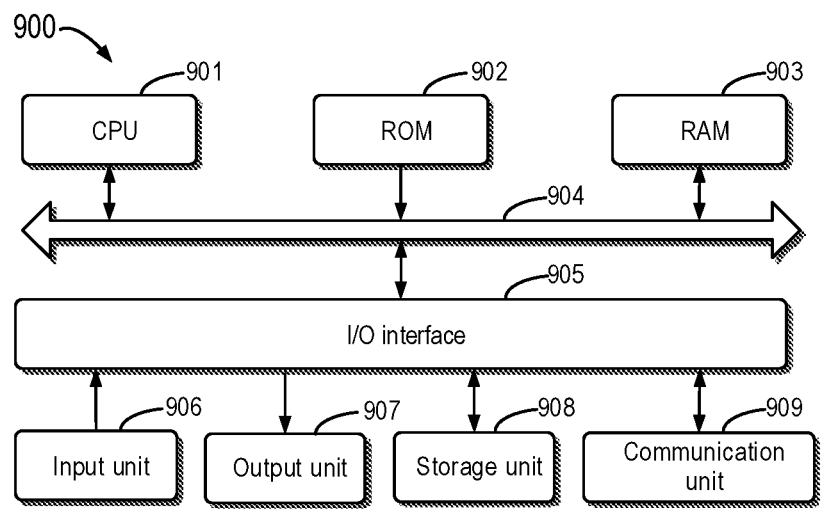
FIG. 9 illustrates a schematic block diagram of a device for implementing embodiments of the present disclosure.

FIG. 9 illustrates a schematic block diagram of a device 900 for implementing embodiments of the present disclosure. For example, the device 900 may be device or apparatus of an embodiment of the present disclosure. As shown, the device 900 includes a central processing unit (CPU) 901, which can execute various suitable acts and processing based on the computer program instructions stored in the read-only memory (ROM) 902 or computer program instructions loaded in the random-access memory (RAM) 903 from a storage unit 908. The RAM 903 can also store all kinds of programs and data required by the operations of the device 900. CPU 901, ROM 902 and RAM 903 are connected to each other via a bus 904. The input/output (I/O) interface 905 is also connected to the bus 904.

A plurality of components in the electronic device 900 may be connected to the I/O interface 905, including: an input unit 906, such as keyboard, mouse and the like; an output unit 907, e.g., various kinds of display and loudspeakers etc.; a storage unit 908, such as magnetic disk and optical disk etc.; and a communication unit 909, such as network card, modem, wireless transceiver and the like. The communication unit 909 allows the electronic device 900 to exchange information/data with other devices via the computer network, such as Internet, and/or various telecommunication networks.

The above described method or processing can also be executed by the processing unit 901. For example, in some embodiments, the method can be implemented as a computer software program tangibly included in the machine-readable medium, e.g., storage unit 908. In some embodiments, the computer program can be partially or fully loaded and/or mounted to the electronic device 900 via ROM 902 and/or communication unit 909. When the computer program is loaded to RAM 903 and executed by the CPU 901, one or more steps of the above described method or processing may be implemented.

In some embodiments, the methods and processes described above may be implemented as a computer program product. The computer program product may include a computer-readable storage medium, on which the computer-readable program instructions for executing various aspects of the present disclosure are loaded.

The computer-readable storage medium may be a tangible apparatus that maintains and stores instructions utilized by the instruction executing apparatuses. The computer-readable storage medium can be, but not limited to, an electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction may be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, firmware instructions, state setting data, or source codes or target codes written in any combination of one or more programming languages, wherein the programming languages consist of object-oriented programming languages, and traditional procedural programming languages. The computer-readable program instructions can be implemented fully on the user computer, partially on the user computer, as an independent software package, partially on the user computer and partially on the remote computer, or completely on the remote computer or server. In the case where a remote computer is involved, the remote computer can be connected to the user computer via any type of network, including local area network (LAN) and wide area network (WAN), or to the external computer (e.g., connected via Internet using the Internet service provider). In some embodiments, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

The computer-readable program instructions can be provided to the processing unit of a general-purpose computer, dedicated computer or other programmable data processing apparatuses to manufacture a machine, such that the instructions that, when executed by the processing unit of the computer or other programmable data processing apparatuses, generate an apparatus for implementing functions/acts stipulated in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/acts stipulated in one or more blocks of the flow chart and/or block diagram.

The computer-readable program instructions can also be loaded into a computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/acts stipulated in one or more blocks of the flow chart and/or block diagram.

The flow chart and block diagram in the drawings illustrate system architecture, functions and operations that may be implemented by system, method and computer program product according to multiple implementations of the present disclosure. In this regard, each block in the flow chart or block diagram can represent a module, a part of a program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks can in fact be executed in parallel or sometimes in a reverse order depending on the involved functions. It should also be noted that each block in the block diagram and/or flow chart and combinations of the blocks in the block diagram and/or flow chart can be implemented by a hardware-based system exclusively for executing stipulated functions or acts, or by a combination of dedicated hardware and computer instructions.

Various implementations of the present disclosure have been described above and the above description is only by way of example rather than exhaustive and is not limited to the implementations of the present disclosure. Many modifications and alterations, without deviating from the scope and spirit of the explained various implementations, are obvious for those skilled in the art. The selection of terms in the text aims to best explain principles and actual applications of each implementation and technical improvements made in the market by each embodiment, or enable others of ordinary skill in the art to understand implementations of the present disclosure.

We claim:

1. A method for storage, comprising:
   determining a number of disks in a storage system, the storage system being based on Redundant Array of Independent Disks (RAID) and comprising multiple types of disks, the number of disks being less than or equal to a predetermined threshold;
   determining, according to the number of disks and the predetermined threshold, a target number of RAID sets to be allocated in the storage system; and
   allocating the multiple types of disks to the RAID sets according to the target number and types of disks;
   wherein the multiple types of disks comprise a first type of disks and a second type of disks;

wherein determining a target number of RAID sets to be allocated in the storage system comprises:
  in response to the determined number of disks being less than or equal to the predetermined threshold, determining that the target number of the RAID sets is a first value; and
wherein allocating the multiple types of disks to the RAID sets comprises:
  in response to the determination that the target number of the RAID sets is the first value, determining a particular disk type to move to a RAID set based on whether a total number of the first type of disks is less than a width threshold;
  when the total number of the first type of disks is greater than or equal to the width threshold, moving the second type of disks to a RAID set comprising the first type of disks; and
  when the total number of the first type of disks is less than the width threshold, moving the first type of disks to a RAID set comprising the second type of disks.

2. The method of claim 1, further comprising:
in accordance with a determination that a new disk is added into the storage system, determining a new target number of the RAID sets.

3. The method of claim 1, further comprising:
providing a first storage service using a first RAID set comprising the first type of disks; and
providing a second storage service using a second RAID set comprising the second type of disks, a storage performance of the first storage service being better different than a storage performance of the second storage service.

4. The method according to claim 1, wherein the first type of disks are non-volatile memory flash (NVME) solid state disks (SSDs), and the second type of disks are serial-attached SCSI (SAS) SSDs.

5. A method for storage, comprising:
determining the number of disks in a storage system, the storage system being based on Redundant Array of Independent Disks (RAID) and comprising multiple types of disks, the number of disks being greater than a predetermined threshold;
determining, according to the number of disks and the predetermined threshold, a target number of RAID sets to be allocated in the storage system; and
allocating the multiple types of disks to the RAID sets according to the target number and types of disks;
wherein the multiple types of disks comprise a first type of disks and a second type of disks;
wherein determining a target number of RAID sets to be allocated in the storage system comprises:
  in response to the determined number of disks being greater than the predetermined threshold, determining that the target number of the RAID sets is greater than the first value; wherein allocating the multiple types of disks to the RAID sets comprises:
    in response to the determination that the target number of the RAID sets is greater than the first value, determining a first number for allocating the first type of disks and a second number for allocating the second type of disks, a sum of the first number and the second number being equal to the target number; and
    allocating the multiple types of disks to multiple RAID sets according to the target number of the RAID sets, the first number, and the second number; and
  wherein allocating the multiple types of disks to multiple RAID sets comprises:
    in response to the sum of the determined first number and the determined second number being equal to the target number, determining that at least one of a total number of the first type of disks and a total number of the second type of disks is less than a width threshold;
    when the total number of the first type of disks is less than the width threshold, moving one or more of the second type of disks to a RAID set comprising the first type of disks; and
    when the total number of the second type of disks is less than the width threshold, moving one or more of the first type of disks to a RAID set comprising the second type of disks.

6. The method of claim 5, further comprising:
in accordance with a determination that a new disk is added into the storage system, determining a new target number of the RAID sets.

7. The method of claim 5, further comprising:
providing a first storage service using a first RAID set comprising the first type of disks; and
providing a second storage service using a second RAID set comprising the second type of disks, a storage performance of the first storage service being different than a storage performance of the second storage service.

8. The method according to claim 5, wherein the first type of disks are non-volatile memory flash (NVME) solid state disks (SSDs), and the second type of disks are serial-attached SCSI (SAS) SSDs.

9. An electronic device, comprising:
a processing unit; and
a memory coupled to the processing unit and storing instructions that, when executed by the processing unit, performing acts of:
  determining the number of disks in a storage system, the storage system being based on Redundant Array of Independent Disks (RAID) and comprising multiple types of disks;
  determining, according to the number of disks and a predetermined threshold, the target number of RAID sets to be allocated in the storage system; and
  allocating the multiple types of disks to the RAID sets according to the target number and types of disks;
wherein the multiple types of disks comprise a first type of disks and a second type of disks;
wherein determining a target number of RAID sets to be allocated in the storage system comprises:
  in accordance with a determination that the number of disks is less than or equal to the predetermined threshold, determining that the target number of the RAID sets is a first value; and
  in accordance with a determination that the number of disks is greater than the predetermined threshold, determining that the target number of the RAID sets is greater than the first value; and
wherein allocating the multiple types of disks to the RAID sets comprises:
  in accordance with a determination that the target number of the RAID sets is the first value, determining whether the number of the first type of disks is less than a width threshold;

in accordance with a determination that the number of the first type of disks is greater than or equal to the width threshold, moving the second type of disks to a RAID set comprising the first type of disks; and in accordance with a determination that the number of the first type of disks is less than the width threshold, moving the first type of disks to a RAID set comprising the second type of disks.

10. The device of claim 9, wherein the acts further comprise:
in accordance with a determination that a new disk is added into the storage system, determining a new target number of the RAID sets.

11. The device of claim 9, wherein the acts further comprise:
providing a first storage service using a first RAID set comprising the first type of disks; and
providing a second storage service using a second RAID set comprising the second type of disks, a storage performance of the first storage service being different than a storage performance of the second storage service.

12. The device according to claim 9, wherein the first type of disks are non-volatile memory flash (NVME) solid state disks (SSDs), and the second type of disks are serial-attached SCSI (SAS) SSDs.

13. An electronic device, comprising:
a processing unit; and
a memory coupled to the processing unit and storing instructions that, when executed by the processing unit, performing acts of:
determining the number of disks in a storage system, the storage system being based on Redundant Array of Independent Disks (RAID) and comprising multiple types of disks;
determining, according to the number of disks and a predetermined threshold, the target number of RAID sets to be allocated in the storage system; and
allocating the multiple types of disks to the RAID sets according to the target number and types of disks;
wherein the multiple types of disks comprise a first type of disks and a second type of disks;
wherein determining a target number of RAID sets to be allocated in the storage system comprises:
in accordance with a determination that the number of disks is less than or equal to the predetermined threshold, determining that the target number of the RAID sets is a first value; and
in accordance with a determination that the number of disks is greater than the predetermined threshold, determining that the target number of the RAID sets is greater than the first value;
wherein allocating the multiple types of disks to the RAID sets comprises:
in accordance with a determination that the target number of the RAID sets is greater than the first value, determining a first number for allocating the first type of disks and a second number for allocating the second type of disks; and
allocating the multiple types of disks to multiple RAID sets according to the target number of the RAID sets, the first number, and the second number; and
wherein allocating the multiple types of disks to multiple RAID sets comprises:

in accordance with a determination that a sum of the first number and the second number is equal to the target number:
in accordance with a determination that the number of the first type of disks is less than a width threshold, moving one or more of the second types of disks to a RAID set comprising the first type of disks; and
in accordance with a determination that the number of the second type of disks is less than the width threshold, moving one or more of the first type of disks to a RAID set comprising the second type of disks.

14. The device of claim 13, wherein the acts further comprise:
in accordance with a determination that a new disk is added into the storage system, determining a new target number of the RAID sets.

15. The device of claim 13, wherein the acts further comprise:
providing a first storage service using a first RAID set comprising the first type of disks; and
providing a second storage service using a second RAID set comprising the second type of disks, a storage performance of the first storage service being different than a storage performance of the second storage service.

16. The device according to claim 13, wherein the first type of disks are non-volatile memory flash (NVME) solid state disks (SSDs), and the second type of disks are serial-attached SCSI (SAS) SSDs.

17. A computer program product having a non-transitory computer readable medium which stores a set of instructions to perform storage; the set of instructions, when carried out by computerized circuitry, causing the computerized circuitry to perform a method of:
determining the number of disks in a storage system, the storage system being based on Redundant Array of Independent Disks (RAID) and comprising multiple types of disks;
determining, according to the number of disks and a predetermined threshold, a target number of RAID sets to be allocated in the storage system; and
allocating the multiple types of disks to the RAID sets according to the target number and types of disks;
wherein the multiple types of disks comprise a first type of disks and a second type of disks;
wherein determining a target number of RAID sets to be allocated in the storage system comprises:
in accordance with a determination that the number of disks is less than or equal to the predetermined threshold, determining that the target number of the RAID sets is a first value; and
in accordance with a determination that the number of disks is greater than the predetermined threshold, determining that the target number of the RAID sets is greater than the first value; and
wherein allocating the multiple types of disks to the RAID sets comprises:
in accordance with a determination that the target number of the RAID sets is the first value, determining whether the number of the first type of disks is less than a width threshold;
in accordance with a determination that the number of the first type of disks is greater than or equal to the width threshold, moving the second type of disks to a RAID set comprising the first type of disks; and in accordance with a determination that the number of the first type of disks is less than the width threshold, moving the first type of disks to a RAID set comprising the second type of disks.

18. The computer program product of claim 17, wherein the method further comprises:

in accordance with a determination that a new disk is added into the storage system, determining a new target number of the RAID sets.

19. The computer program product of claim 17, wherein the method further comprises:

providing a first storage service using a first RAID set comprising the first type of disks; and providing a second storage service using a second RAID set comprising the second type of disks, a storage performance of the first storage service being different than a storage performance of the second storage service.

20. The computer program product according to claim 17, wherein the first type of disks are non-volatile memory flash (NVME) solid state disks (SSDs), and the second type of disks are serial-attached SCSI (SAS) SSDs.

\* \* \* \* \*